(12) United States Patent
Tsafrir et al.

(10) Patent No.: US 12,494,073 B2
(45) Date of Patent: Dec. 9, 2025

(54) OBJECT LABELING IN IMAGES USING DENSE DEPTH MAPS

(71) Applicant: Cognata Ltd., Rehovot (IL)

(72) Inventors: Ilan Tsafrir, Shoham (IL); Guy Tsafrir, Zikhron-Yaakov (IL); Ehud Spiegel, Petach-Tikva (IL); Dan Atsmon, Rehovot (IL)

(73) Assignee: Cognata Ltd., Rehovot (IL)

( * ) Notice: Subject to any disclaimer, the term of this patent is extended or adjusted under 35 U.S.C. 154(b) by 484 days.

(21) Appl. No.: 18/022,556

(22) PCT Filed: Sep. 14, 2021

(86) PCT No.: PCT/IL2021/051130
§ 371 (c)(1),
(2) Date: Feb. 22, 2023

(87) PCT Pub. No.: WO2022/054069
PCT Pub. Date: Mar. 17, 2022

(65) Prior Publication Data
US 2023/0316789 A1 Oct. 5, 2023

Related U.S. Application Data

(60) Provisional application No. 63/077,729, filed on Sep. 14, 2020.

(51) Int. Cl.
*G06V 20/70* (2022.01)
*G06V 10/77* (2022.01)
*G06V 20/58* (2022.01)

(52) U.S. Cl.
CPC .......... *G06V 20/70* (2022.01); *G06V 10/7715* (2022.01); *G06V 20/58* (2022.01)

(58) Field of Classification Search
CPC ........ G06V 20/70; G06V 20/58; G06V 20/40; G06V 20/64; G06V 10/7715; G06V 10/25;
(Continued)

(56) References Cited

U.S. PATENT DOCUMENTS 10,839,530 B1 * 11/2020 Berger ................... G06N 20/00
10,984,543 B1 * 4/2021 Srinivasan ............. G06V 20/56
(Continued)

FOREIGN PATENT DOCUMENTS

| CN | 110622213 | 12/2019 |
|---|---|---|
| WO | WO 2020/064955 | 4/2020 |
| WO | WO 2022/054069 | 3/2022 |

OTHER PUBLICATIONS

International Preliminary Report on Patentability Mar. 23, 2023 From the International Bureau of WIPO Re. Application No. PCT IL2021/051130. (11 Pages).

(Continued)

*Primary Examiner* — Carol W Chan

(57) ABSTRACT

There is provided a method for annotating digital images for training a machine learning model, comprising: generating, from digital images and a plurality of dense depth maps, each associated with one of the digital images, an aligned three-dimensional stacked scene representation of a scene, where the digital images are captured by sensor(s) at the scene, and where each point in the three-dimensional stacked scene is associated with a stability score indicative of a likelihood the point is associated with a static object of the scene, removing from the three-dimensional stacked scene unstable points to produce a static three-dimensional stacked scene, detecting in at least one of the digital images static object(s) according to the static three-dimensional stacked scene, and classifying and annotating the static (Continued)

object(s). The machine learning model may be trained on the images annotated with a ground truth of the static object(s).

20 Claims, 12 Drawing Sheets

(58) Field of Classification Search
CPC ...... G06V 10/255; G06V 10/26; G06V 10/62; G06V 10/757; G06V 10/7753; G06V 10/803; G06V 10/806; G06N 20/00
See application file for complete search history.

(56) References Cited

U.S. PATENT DOCUMENTS

| | | | |
|---|---|---|---|
| 2016/0299210 A1* | 10/2016 | Zeine | G06Q 30/0267 |
| 2017/0124476 A1 | 5/2017 | Levinson et al. | |
| 2019/0080462 A1 | 3/2019 | Jung et al. | |
| 2019/0258737 A1 | 8/2019 | Wang et al. | |
| 2019/0340753 A1 | 11/2019 | Brestel et al. | |

OTHER PUBLICATIONS

International Search Report and the Written Opinion Dated Dec. 7, 2021 From the International Searching Authority Re. Application No. PCT/IL2021/051130 (18 Pages).
Notification of Office Action and Search Report Dated Mar. 28, 2025 From the State Intellectual Property Office of the People's Republic of China Re. Application No. 202180070086.3 and Its Machine Translation of Office Action into English. (23 Pages).
Supplementary Partial European Search Report and the European Provisional Opinion [Communication Pursuant to Rule 164(1) EPC] Dated Aug. 20, 2024 From the European Patent Office Re. Application No. 21866229.4. (18 Pages).
English Summary Dated May 5, 2025 of Notification of Office Action and Search Report Dated Mar. 28, 2025 From the State Intellectual Property Office of the People's Republic of China Re. Application No. 202180070086.3 and Its Machine Translation of Office Action into English. (4 Pages).
Supplementary European Search Report and the European Search Opinion Dated Nov. 14, 2024 From the European Patent Office Re. Application No. 21866229.4. (13 Pages).

* cited by examiner

OBJECT LABELING IN IMAGES USING DENSE DEPTH MAPS

RELATED APPLICATIONS

This application is a National Phase of PCT Patent Application No. PCT/IL2021/051130 having International filing date of Sep. 14, 2021, which claims the benefit of priority under 35 USC § 119(e) of U.S. Provisional Patent Application No. 63/077,729 filed on Sep. 14, 2020 The contents of the above applications are all incorporated by reference as if fully set forth herein in their entirety.

FIELD AND BACKGROUND OF THE INVENTION

Some embodiments described in the present disclosure relate to image processing and, more specifically, but not exclusively, to image processing in the field of machine learning.

Machine learning models, such as neural networks, are trained on images which are annotated with a ground truth label indicating presence or absence of an object. The label may be, for example, a bounding box enclosing the object. Trained machine learning models generate an outcome of the presence or absence of the object in response to a new image, for example, by generating a bounding box on the input new image enclosing the detected object.

In digital image processing, a bounding box is a set of coordinates that fully encloses an object captured in a digital image of a scene or in a three-dimensional model of the scene. A bounding box may be a rectangular border that fully encloses the object in a two-dimensional digital image. A bounding box may be another convex set that encloses the object in the two-dimensional digital image. In a three-dimensional model, a bounding box may be a three-dimensional convex set that encloses the object in the three-dimensional model.

SUMMARY OF THE INVENTION

According to a first aspect, a method for annotating a plurality of digital images, comprises: generating, from a plurality of digital images and a plurality of dense depth maps, each associated with one of the plurality of digital images, an aligned three-dimensional stacked scene representation of a scene, where the plurality of digital images are captured by at least one sensor at the scene, and where each point in the three-dimensional stacked scene is associated with a stability score indicative of a likelihood the point is associated with a static object of the scene, removing from the three-dimensional stacked scene a plurality of instable points to produce a static three-dimensional stacked scene, detecting in at least one of the plurality of digital images at least one static object according to the static three-dimensional stacked scene, and classifying and annotating the at least one static object.

According to a second aspect, a method for generating instructions for real time object recognition for a vehicle, comprises: feeding at least one target image captured by a camera located on a moving vehicle into a ML model training on a training dataset comprising a plurality of records, wherein a record includes the at least one of the plurality of digital images for which at least one static object is detected, and a ground truth label indication of the at least one static object, the ground truth label computed by: generating, from a plurality of digital images and a plurality of dense depth maps, each associated with one of the plurality of digital images, an aligned three-dimensional stacked scene representation of a scene, where the plurality of digital images are captured by at least one sensor at the scene, and where each point in the three-dimensional stacked scene is associated with a stability score indicative of a likelihood the point is associated with a static object of the scene, removing from the three-dimensional stacked scene a plurality of instable points to produce a static three-dimensional stacked scene, detecting in at least one of the plurality of digital images at least one static object according to the static three-dimensional stacked scene, and generating the ground truth label indicating classifying and annotating the at least one static object, obtaining as an outcome of the machine learning model, an indication of at least one target object depicted in the target image, and generating instructions according to the at least one target object.

According to a third aspect, a method of training a ML model for real time object recognition for a vehicle, comprises: creating a training dataset comprising a plurality of records, wherein a record includes: at least one of a plurality of digital images captured by at least one onboard camera of at least one vehicle, and a ground truth label indication of at least one static object detected in the at least one of the plurality of digital images, the ground truth label computed by: generating, from a plurality of digital images and a plurality of dense depth maps, each associated with one of the plurality of digital images, an aligned three-dimensional stacked scene representation of a scene, where the plurality of digital images are captured by at least one sensor at the scene, and where each point in the three-dimensional stacked scene is associated with a stability score indicative of a likelihood the point is associated with a static object of the scene, removing from the three-dimensional stacked scene a plurality of instable points to produce a static three-dimensional stacked scene, detecting in at least one of the plurality of digital images at least one static object according to the static three-dimensional stacked scene, and generating the ground truth label indicating classifying and annotating the at least one static object, and training a machine learning model on the training dataset for generating an outcome of at least one target object in response to an input of at least one target image, wherein the outcome of the at least one target object depicted in the at least one target image is used to generate instructions for controlling the vehicle.

In a further implementation form of the first, second, and third aspects, detecting the at least one static object according to the static three-dimensional stacked scene comprises: identifying in the at least one image a set of static pixels by projecting the static three-dimensional stacked scene onto the at least one image, extracting the set of static pixels from the at least one image to create a static image, and detecting the at least one static object in the static image.

In a further implementation form of the first, second, and third aspects, further comprising: detecting, in at least one other of the plurality of digital images at least one other static object according to the static three-dimensional stacked scene, identifying, according to the static three-dimensional stacked scene, that the at least one static object is the at least one other static object, and classifying and annotating the at least one other static object according to a classification and annotation of the at least one static object.

In a further implementation form of the first, second, and third aspects, the at least one digital image precedes the at least one other digital image in the sequence of digital images.

In a further implementation form of the first, second, and third aspects, the at least one other digital image precedes the at least one digital image in the sequence of digital images.

In a further implementation form of the first, second, and third aspects, detecting the at least one static object according to the static three-dimensional stacked scene comprises detecting the at least one static object in the static three-dimensional stacked scene.

In a further implementation form of the first, second, and third aspects, further comprising: applying a simultaneous localization and mapping (SLAM) method to the sequence of digital images to produce a plurality of registered digital images and a camera path comprising a plurality of camera positions and camera orientations associated therewith, wherein generating the stacked scene is further by using the plurality of registered digital images and the camera path.

In a further implementation form of the first, second, and third aspects, further comprising: removing from the stacked scene a plurality of stable points to produce a dynamic three-dimensional stacked scene, detecting in at least one additional other of the plurality of digital images at least one dynamic object according to the dynamic three-dimensional stacked scene, and classifying and annotating the at least one dynamic object.

In a further implementation form of the first, second, and third aspects, detecting the at least one dynamic object according to the dynamic three-dimensional stacked scene comprises: identifying in the at least one additional other image a set of dynamic pixels by projecting the dynamic three-dimensional stacked scene onto the at least one additional other image, extracting the set of dynamic pixels from the at least one additional other image to create a dynamic image, and detecting the at least one dynamic object in the dynamic image.

In a further implementation form of the first, second, and third aspects, further comprising: detecting, in at least one further other of the plurality of digital images at least one other dynamic object according to the dynamic three-dimensional stacked scene, identifying, according to the dynamic three-dimensional stacked scene, that the at least one dynamic object is the at least one other dynamic object, and classifying and annotating the at least one other dynamic object according to a classification and annotation of the at least one dynamic object.

In a further implementation form of the first, second, and third aspects, the at least one additional other digital image precedes the at least one further other digital image in the sequence of digital images.

In a further implementation form of the first, second, and third aspects, the at least one further other digital image precedes the at least one additional other digital image in the sequence of digital images.

In a further implementation form of the first, second, and third aspects, further comprising creating a training dataset comprising a plurality of records, wherein a record includes the at least one of the plurality of digital images, and a ground truth label indication of the at least one static object.

In a further implementation form of the first, second, and third aspects, the record further includes at least one other digital image of the plurality of digital images and a ground truth label indication of at least one other static object according to a classification and annotation of the at least one static object.

In a further implementation form of the first, second, and third aspects, the record further includes the dense depth map associated with the at least one of the plurality of digital images.

In a further implementation form of the first, second, and third aspects, the record further includes at least one additional other of the plurality of digital images, and a ground truth label of an indication of at least one dynamic object.

In a further implementation form of the first, second, and third aspects, further comprising training a machine learning model on the training dataset for generating an outcome of at least one target object in response to an input of at least one target image.

In a further implementation form of the first, second, and third aspects, a plurality of images of a plurality of records of the training dataset are captured by at least one camera located on at least one vehicle.

In a further implementation form of the first, second, and third aspects, generating instructions comprises generating instructions for automatically maneuvering the vehicle to avoid collision with the at least one target object.

In a further implementation form of the first, second, and third aspects, generating instructions comprises generating a warning on a user interface to warn a driver of the vehicle of the detected at least one target object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

Figure 1:
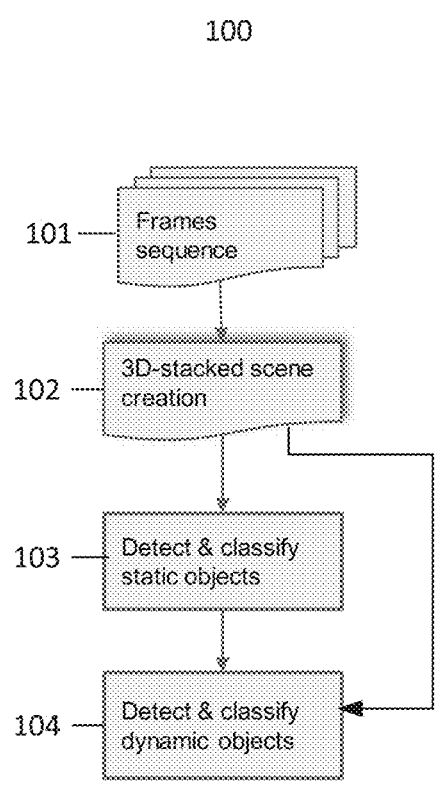
FIG. 1 is a flowchart schematically representing an optional flow of operations, according to some embodiments.

Some embodiments described in the present disclosure relate to image processing and, more specifically, but not exclusively, to image processing in the field of autonomous driving.

As used herein, the term vehicle means a machine that transports people or objects mainly on land. Exemplary vehicles include: cars, trucks, electric bicycles, motorcycles, busses, forklifts, snow plows, snowmobiles, off road vehicles, and hovercraft. The vehicle may be a standard manual car, a semi-automatic car, or a fully automated vehicle. A driver may take an active role in driving the vehicle, such that the driver plays a critical role in directing the vehicle. The driver may provide active control of the vehicle. The driver may provide continuous active control of the vehicle, or partial active control of the vehicle where some driving parts are automated, for example, automatic driving during cruising control activation on the highway, and automated parking. Alternatively, the driver plays a minimal roll, where the vehicle is fully automated and drives itself.

Optionally, the term vehicle is a non-automated vehicle. The term vehicle may exclude automated cars in which the driver does not actually actively drive the vehicle, but the vehicle automatically drives itself. Alternatively, the term vehicle includes an automated vehicle, in which the driver plays a minimal or partial role.

As used herein, the term advanced driver assistance system (ADAS) means systems designed to help the driver drive better, by increasing road safety and/or car safety, i.e., reducing likelihood of adverse events. ADAS are designed with the goal of reducing human error of the driver, which may lead to adverse events. ADAS may automate some driving tasks, may adapt some driving tasks, and/or may enhance some driving tasks. For example, ADAS may generate alerts to the driver warning of a dangerous scenario likely to result in an adverse event, for example, vehicle drifting out of its lane, pedestrians crossing the street, and a distance to the car ahead is too close. ADAS may perform automated tasks when a dangerous scenario is automatically detected, for example, automated braking when the distance to the car ahead is decreasing, and automated steering of the vehicle to avoid a collision. Other ADAS systems may attempt to increase safety, for example, by automatically turning on lights, automatically turning on windshield wipers, monitoring blind spots, and rear view cameras.

ADAS may include an Autonomous Driving System (ADS). As used herein, the terms ADAS and ADS may sometimes be interchanged.

The ADAS and/or ADS referred to herein utilize the ML models described herein, which are trained on annotated images created by automatically annotating receives images, using approach described herein. For example, the ML model is fed images in real time captured by onboard cameras, and generates an outcome indicating objects identified in the images, such as a pedestrian, another car moving into an oncoming lane, a motorcycle speeding up from the rear, and the like.

As used herein, the term point may refer to a single pixel, a group of neighboring pixels, a single voxel, and/or a group of neighboring voxels, or other elements of data representing the 3D stacked scene and/or images, for example, a vector.

An aspect of some embodiments of the present invention relates to systems, methods, a computing device, and/or code instructions (stored on a memory and executable by one or more hardware processors) for automatically creating an annotated training dataset for training a machine learning (ML) model. The annotation may be of images captured by cameras located on vehicles. The trained ML model may be used by ADAS of vehicles, optionally automatically driven vehicles, for example, for real time recognition of objects captured by onboard cameras installed on the automated vehicle. An aligned three-dimensional stacked scene representation of a scene is generated from digital images and dense depth maps, each associated with one of the digital images. The digital images may be a sequence of images captured over time by a camera, for example, frames of a video captured over about 1-3 seconds (or other time values). The digital images are captured by sensor(s) at the scene, for example, onboard cameras located on vehicles (i.e., to collect sample images for training the ML model). Each point in the three-dimensional stacked scene is associated with a stability score indicative of a likelihood the point is associated with a static object of the scene. Unstable points may represent dynamic objects, such as a moving vehicle. Unstable points are removed from the three-dimensional stacked scene to produce a static three-dimensional stacked scene. In at least one of the digital images, at least one static object is detected according to the static three-dimensional stacked scene. The at least one static object is annotated and/or classified. The annotation and/or classification may be performed for the specific images of the multiple images where the static object is identified. Optionally, the static object(s) is annotated in each of the digital images by following the location of the static object across the multiples images from the image where the static object is identified. For example, when the static object is found in the middle of a sequence of digital images, instances of the static object in earlier and later images are annotated with the same indication of static object. The annotation represents a ground truth. The annotated and/or classified images, optionally the sequence of images with annotations, may denote a record. Multiple records may be created by annotating and/or classifying multiple sets of sequential images, for example, over different time intervals, of different scenes, and/or captured by different cameras on different vehicles. A training dataset that includes the multiple records may be created. The ML model may be trained on the multiple records. The ML model may be used, for example, by an automatic driving process of an automated vehicle for obtaining real time object recognition in response to feeding real time images captured by onboard vehicle cameras into the ML model, and/or by an ADAS that assists drivers by automatic real time objet recognition and warning. For example, triggering automatic braking when a hazard on the road is spotted, and/or maneuvering the vehicle to avoid a collision with a motorcycle moving towards the vehicle.

Examples of static objects that are automatically annotated include: traffic signs, road obstacles, pot holes, snow piles, parked cars, buildings, traffic lights, and the like.

Examples of dynamic objects that are automatically annotated include: vehicles moving in the same lane, vehicles in an oncoming lane, vehicles moving on a different road, pedestrians, motorcycles, bicycles, and the like.

Exemplary architectures of the machine learning model(s) described herein include, for example, statistical classifiers and/or other statistical models, neural networks of various architectures (e.g., convolutional, fully connected, deep, encoder-decoder, recurrent, graph), support vector machines (SVM), logistic regression, k-nearest neighbor, decision trees, boosting, random forest, a regressor, and/or any other commercial or open source package allowing regression, classification, dimensional reduction, supervised, semi-supervised or reinforcement learning. Machine learning models are trained using supervised approaches, on an annotated training dataset set created by annotating images using approaches described herein.

At least some implementations described herein address the technical problem of automatic annotation of images for training ML models, in particular ML models used for real time object recognition for controlling automated vehicles and/or assisting drivers of vehicles. In particular, increasing the number of annotated images for increasing the size of the training dataset for training ML models. Larger training dataset increase performance of the ML models. At least some implementations described herein improve the technical field of ML models, by providing a larger number of annotated images than would otherwise be available using standard approaches. The larger training dataset from the larger number of annotated images increase performance of the ML model.

In at least some implementations described herein, the solution to the technical problem and/or the improvement, is in the ability to automatically annotated objects which cannot be identified and/or not accurately identified using standard approaches. For example, using manual approaches and/or using standard neural networks. For example, small traffic signs captured by a camera from far away cannot be read using such standard approaches, but are annotated using embodiments described herein, for example, by identifying a larger readable instance of the same sign in a sequence of images and annotating earlier and/or later instances of the same sign that appear smaller.

In at least some implementations described herein, the solution to the technical problem and/or the improvement, is in the ability to automatically annotated static and/or dynamic objects which cannot be identified and/or not accurately identified using standard approaches. For example, using standard approaches, it is unclear if a car is parked on the side of the road in which case the car may not necessarily be a hazard, or if the car is moving towards the vehicle for a collision in which case active motion of the vehicle may be required to avoid a crash. At least some embodiments annotated static and/or dynamic objects, as described herein.

At least some implementations described herein provide a technical solution to the above mentioned technical problem, and/or improve the above mentioned technical field, by identifying one or more dynamic objects using the stacked scene produced using a plurality of dense depth maps facilitates identifying and annotating one or more objects under harsh transitions conditions, such as transition in an entrance or an exit of a tunnel where light level changes abruptly and therefore the camera is in sudden blindness or over-exposure, and additionally or alternatively annotating one or more relevant objects not at a current level of the road such as a vehicle on another road at another level that is due to interconnect to the level of the vehicle producing the images through its sensors, and additionally or alternatively transitions between urban-roads to highway.

At least some implementations described herein provide a technical solution to the above mentioned technical problem, and/or improve the above mentioned technical field, by using the sequence of annotated images generated from the sequence of images as described herein to train, validate, test, verify, or any combination thereof, an ML model used by an autonomous driving system, for example an ADS or an ADAS, or a component thereof.

For brevity, unless otherwise noted the term "image" is used to mean a digital image and the terms are used interchangeably. In the field of autonomous driving, it is common practice for a system, for example an Autonomous Driving System (ADS) or an Advance Driver-Assistance System (ADAS), to include one or more machine learning models for processing digital images captured by one or more sensors, some examples or a sensor being a digital camera, a digital video camera, and a laser imaging, detection, and ranging sensor (LIDAR). A video recording may comprise a sequence of video images, such that each image is a frame of the video recording. It is common practice to train such machine learning models using a plurality of annotated digital images, where one or more objects captured in the digital images are each classified and bounded by a bounding box. The plurality of annotated digital images may be a sequence of digital images, for example from a video recording. Other uses of a plurality of annotated digital images in the field of autonomous driving include validation of a machine learning model, verification of a machine learning model, and testing of a machine learning model. A plurality of annotated digital images may also be used for one or more of testing, validating, verifying, and training of a system, such as an ADS or an ADAS.

At least some embodiments described herein annotate as many objects as possible in an image. In an image used in the field of autonomous driving, some examples of an object are a sidewalk, a curb, a traffic sign, a traffic light, a billboard, an obstacle, a mountain wall, a ditch, a post such as a lamp post, a rail, a fence, a building, a tree, a wall, and a road mark. Some other examples of an object are a vehicle, for example a car, a motorcycle or a truck, a pedestrian, i.e. a person, an animal, a bicycle, and an object moving in the air, for example a bird, a rock, or a piece of paper.

Manually annotating a digital image is labor intensive. Common practice for training a machine learning model requires hundreds, thousands, or more, of annotated digital images. At least some embodiments described herein automate annotation of digital images, i.e. to automate detecting in each digital image a plurality of objects, classifying each of the plurality of objects and identifying a bounding box thereof.

Some existing methods for automated annotation of a digital image include using a machine learning model to detect and classify one or more objects in an image. However, when an object is far from a viewpoint from which the image is captured, the object may appear small and some of the object's features may not be distinguishable in the image. For example, a traffic sign may be captured from a distance such that text written thereon cannot be identified correctly. In another example, it may be difficult to distinguish between types of two-wheel vehicles, for example between a motorcycle and a bicycle. While some existing methods further apply manual modifications to automated annotations, at least some embodiments described herein remove such a manual step.

When image annotation is done in real time, it may be that an object captured in one image at a first time is misidentified, however when the same object is captured in a later image, at a later time than the first time, the object is correctly identified. For example, in a sequence of images a traffic sign may be identified in one image as a speed limit sign with an identified maximum speed value. Such a sign may have been captured in an earlier image in the sequence, however at a distance such that the maximum speed value could not be distinguished. Furthermore, the same sign captured in a later image, after the one image, may be captured at a distance close enough that the sign is truncated and again the maximum speed value cannot be distinguished.

As used herein, the term "annotation" is used to mean classification and additionally or alternatively bounding in a bounding box. Some embodiments described herein propose processing a sequence of images, and using information gleaned from one image of the sequence of images to modify annotation of one or more objects identified in one or more other images of the sequence of images. At least some of the one or more other images may precede the one image in the sequence of images. At least some other of the one or more other images may succeed the one image in the sequence of images.

To do so, at least some embodiments described herein correctly associate between an object identified in one image and another object identified in another image. When one or more sequences of images are captured by more than one sensor moving in a space, it may be that the sensors are not synchronized in time. Some sensors are one-shot sensors, capturing all pixels of an image instantly. Some other sensors use scanning, capturing pixels of an image over time according to a scanning pattern. A scanning pattern may be continuous. A scanning pattern may be interlaced. When one or more sequences of images are captured by one or more sensors moving in the space, at least some embodiments described herein align, or calibrate, the sequences of images for consistency in the representation in the aligned images of each point of a captured three-dimensional scene. Such alignment is in terms that include, one of more of: aspect ratio, scale, focal point, view point, resolution, scan patterns, and frame rate. Henceforth, the term "registered images" is used to mean a sequence of images aligned for consistency in representation of a captured three-dimensional scene. Visual simultaneous localization and mapping (SLAM) refers to a process of determining the position and orientation of a sensor with respect to its surroundings, while simultaneously mapping the movement path of that sensor in its environment. The principle of SLAM is to use the location of visual features (for example corners) between consecutive images to calculate the position and orientation of a sensor with respect to its surroundings. The process includes looking to filter and use features belonging to the static environment and objects of the scene. Some methods for performing SLAM combine one or more sequences of images captured by one or more sensors with movement information captured by a global positioning system (GPS) sensor and additionally or alternatively by an inertial measurement unit (IMU) to produce a sequence of registered images and additionally or alternatively a camera path, including for each of the sequence of registered images a camera position and a camera orientation. Optionally, the one or more sequences of images are one or more sequences of two-dimensional images.

In a two dimensional image, one object may obscure another object. For example, a moving vehicle may obscure, at least temporarily, a traffic sign. In another example, a parked car may obscure a curb. In a three-dimensional model of a scene, it may be easier to detect and classify an object.

A depth map is an image or image channel that contains information relating to a distance of surfaces or points of scene objects from a viewpoint. When an image is captured by a sensor, a related depth map, when available, contains information relating to a distance of surfaces or points of scene objects from the sensor. Some embodiments described herein propose using dense depth maps, where resolution of each depth map is in a similar order of the resolution of a respective captured image related thereto, to create a three-dimensional representation of a scene and use the three-dimensional representation of the scene to modify one or more annotations of one or more objects identified in one or more images of a sequence of images. Preferably, a dense depth map has a depth value for every pixel of a related image.

In a three-dimensional representation of a scene, describing a three-dimensional scene captured over time in a sequence of images, each point in the model is at a fixed location in the three-dimensional scene. However, content of a point may change over time. For example, when a vehicle moves through the three-dimensional scene, at one time a point may be empty (air), at another time the point may include part of the vehicle and at yet another time the point may be again empty. On the other hand, content of another point may be unchanged over time, for example a point showing part of traffic sign.

For brevity, henceforth the term "stacked scene" is used to mean a three-dimensional representation of a scene, and the terms are used interchangeably.

Some embodiments described herein propose combining a sequence of registered images and a respective sequence of dense depth maps, to produce a three-dimensional representation of a scene (stacked scene) over an identified timeframe. Optionally, the stacked scene comprises a representation of the scene for each of a plurality of times in the identified timeframe. Optionally, the sequence of registered images are a sequence of two-dimensional registered images. Optionally, a camera path produced by a SLAM process is additionally used to produce the stacked scene. Optionally, each point in the three-dimensional model has a stability score, indicative of a likelihood that the point is static, i.e. content of the point does not change in the identified timeframe. Using the respective sequence of depth maps facilitates computing a stability score for each point in the three-dimensional model. Without each depth map of the sequence of depth maps having a resolution no less than a resolution of a respective image related thereto, a stacked scene of the three-dimensional scene would not have a high-enough resolution allowing identification and classification of one or more objects of the three-dimensional scene, for example a small object that is not sampled in a lower resolution depth map. As depth information for every pixel in an image is needed to create a stacked scene of a scene, interpolation between the digital image and a related depth map may be used in lieu of a dense depth map, however such interpolation is less accurate than using a dense depth map.

Optionally, the stacked scene comprises for each pixel of the sequence of registered images its location (point) in the three-dimensional scene. Optionally, a stability score of a point is computed while considering one or more changes in one or more neighboring points.

It is to be understood that embodiments are not necessarily limited in its application to the details of construction and the arrangement of the components and/or methods set forth in the description herein and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
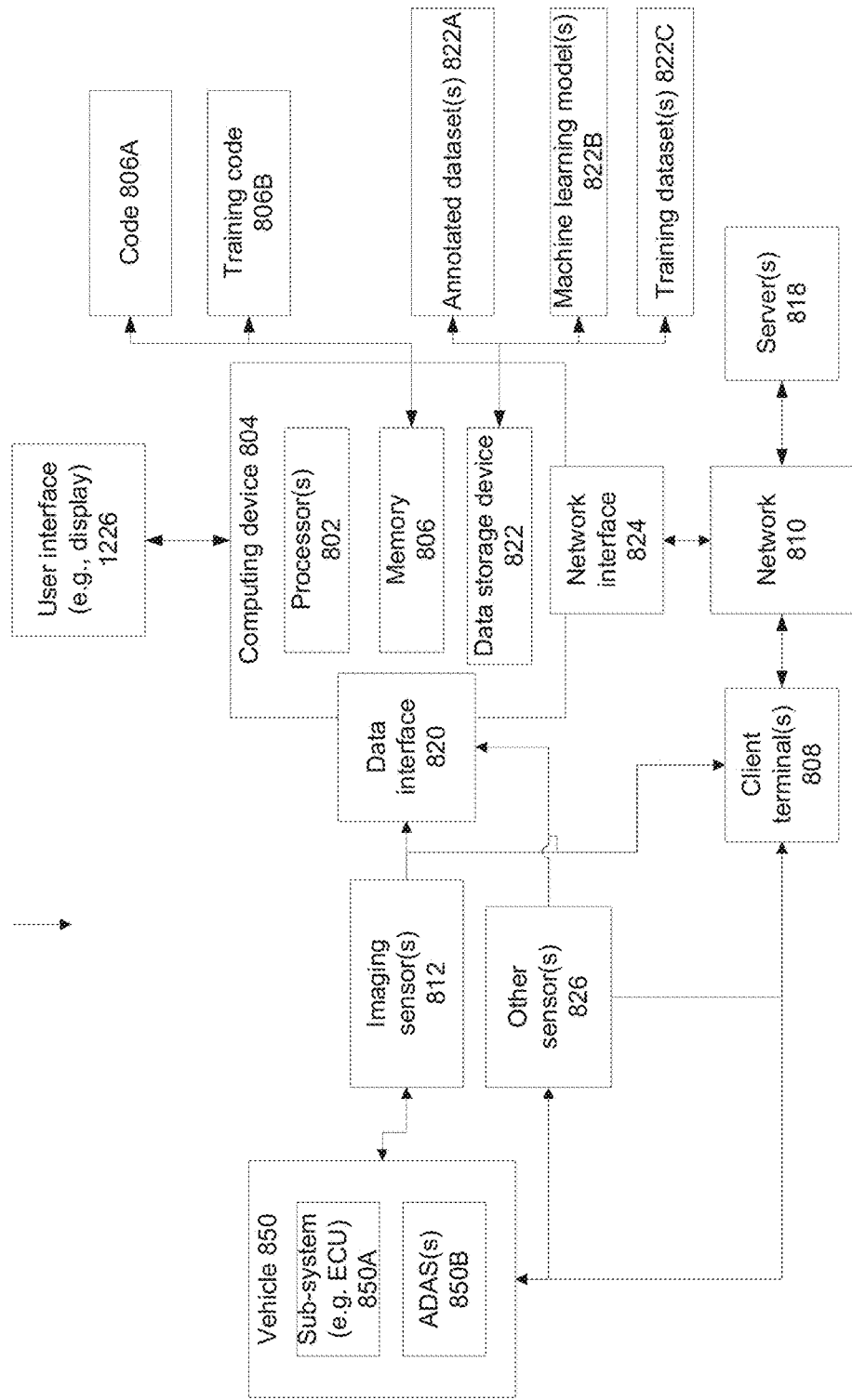
FIG. 8 is a block diagram of a system for annotating images and/or for training a machine learning model on the annotated images according to some embodiments.

Reference is now made to FIG. 1, showing a flowchart schematically representing an optional flow of operations 100 according to some embodiments. Reference is also made to FIG. 8, which is a block diagram of a system for annotating images and/or for training a machine learning model(s) on the annotated images (e.g., on a training dataset that includes the annotated images) according to some embodiments.

System 800 may implement the acts of the method described with reference to FIGS. 1-7B and 9-10, optionally by a hardware processor(s) 802 of a computing device 804 executing code instructions 806A and/or 806B stored in a memory 806.

Computing device 804 may be implemented as, for example, one or more and/or combination of: a group of connected devices, a client terminal, a server, a computing device installed within vehicle 850 (e.g., a vehicle subsystem, a vehicle ECU, a client device connected to a vehicle network, code installed on an existing vehicle computing component), a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing device 804 may be implemented as a component installed within vehicle 850, for example, a dedicated component of vehicle subsystem(s) 850A and/or vehicle ECU, a client device connected to a vehicle network (e.g., directly connected via a cable connected, and/or connected via a temporary wireless network), and/or code installed on an existing vehicle computing component.

Sub-systems 850A of vehicle 850 include components that may be adapted and/or controlled according to objects identified by ML model(s) 822B fed real time images and/or other sensor data, for example, for automatic control of the vehicle.

In an example of a central server based implementation, computing device 804 may include locally stored software that performs one or more of the acts described with reference to FIGS. 1-7B and 9-10, and/or may act as one or more servers (e.g., network server, web server, a computing cloud, virtual server) that receives images and/or other sensor data from one or more client terminals 808 (e.g., local computers associated with different vehicles, such as autonomous vehicles) and/or provides services (e.g., one or more of the acts described with reference to FIGS. 1-7B and 9-10 to one or more client terminals 808 over a network 810, for example, client terminals 808 which may be associated with vehicle(s) 850 establish a communication session with computing device 804, client terminals 808 provide images to computing device 804 and/or obtain a trained machine learning model 822B from computing device 804 for local installation.

In some implementations, multiple client terminals 808 may provide respective images from respective imaging sensor(s) 812 and/or other respective sensor(s) 826 to create a central main annotated dataset 822A. For example, each client terminal 808 is associated with a respective vehicle 850, for example, as an onboard computer, an ECU 850A, and/or a mobile device forming a temporary wireless and/or wired connection with the vehicle 850. Each vehicle 850 has imaging sensor(s) 812 and/or other sensor(s) 826 installed thereon, for example, onboard cameras, onboard sensors, attachable sensors, and the like. Images may be captured by imaging sensor(s) 812 and/or other data is captured by other sensor(s) 826 of vehicle 850 while vehicle 850 is driving, such as being driven by a human driver and/or automatically driven. An annotated dataset 822A is created by annotating the received images, such approaches described herein, for example, FIGS. 1-7B and 9-10 using code 806A. This creates a large number of annotated images that would otherwise be available using standard approaches, for example, providing annotation of small signs and/or other objects, partially depicted signs and/or objects, poor lighting of signs and/or other objects, and the like. The annotated dataset 822A may be a central main annotated dataset 822A that includes annotated images from different vehicles. A central main machine learning model 822B may be trained on central main annotated dataset 822A, for example, using training code 806B. The same central main ML model 822B may be provided to multiple client terminals 808, for example, for local installation thereon for localized use, such as stored on a memory and/or data storage device of respective vehicles 850 associated with the client terminals 808. The ML model 822B may be used for automated driving of vehicle 850, for example, for real time recognition of objects captured in imaging sensors of the vehicle. This may create, for example, a generic ML model used in different vehicles in different geographical locations and/or different weather conditions and/or different light conditions, and other different conditions.

In other example, computing device 804 may provide customized services to individual client terminals 808 and/or for a group of client terminals 808. The customized services may be centrally provided, for example, by a server implementation of computing device 804 that provides customized services to multiple client terminals 808. The customized services may be locally provided, for example, by a local computer implementation of computing device 804 that provides customized local to specific client terminals 808. Each client terminal 808 provides its own respective images from its respective imaging sensor(s) 812 and/or from its other respective sensor(s) 826 to create a personalized annotated dataset 822A specific for that client terminal and/or specific for a group of client terminals. The personalized annotated dataset 822A is created by embodiments for annotation of images described herein. A customized machine learning model 822B may be trained on the customized annotated dataset 822A. The customized ML model 822B may be provided to the specific client terminal or group 808, for example, for local installation thereon for localized use, such as by specific vehicle(s) associated with the specific client terminal(s) 808. This may create, for example, a specific ML model used in specific vehicles such as for motorcycles, for trucks, for police cars, for boats, and for luxury vehicles. The specific ML model may be for different geographical locations, such as different countries, where signs are in different languages, where vehicles are driven on the left or right side of the road, for flat terrain or rolling hills, and the like.

Computing device 804 may provide, for example, software as a service (SaaS) to the client terminal(s) 808, an application for local download to the client terminal(s) 808, as an add-on to a local running application, and/or functions using a remote access session to the client terminals 808, such as through a local running application.

It is noted that training of ML model(s) 822B may be locally performed by computing device 804, and/or remotely by another device (e.g., server) where the trained ML model(s) 822B may be provided to computing device 804 and/or remotely accessed by computing device 804, and/or provided to client terminal(s) 808. Annotation of images to create annotated dataset(s) 822A may be performed by computing device 804.

It is noted that computing device 804 receives the images and/or other sensor data captured by imagine sensor(s) 812 and/or other sensor(s) 826, for example, directly from the sensors, from a computer running on vehicle 850, from a client terminal 808 connected to vehicle 850 and to the sensors, and/or via an image repository such as server 818 (e.g., PACS server, cloud storage, hard disk) where images and/or other sensor data are first uploaded by client terminal 808 and/or vehicle 850 and/or sensors 812 and/or 826.

Exemplary imaging sensor(s) 812 include: a still camera, stereo camera, a video camera, a 2D sensor, a 3D sensor, a color sensor, a black and white sensor, standard visible light sensors (e.g., CCD, CMOS sensors, and/or red green blue (RGB) sensor), short-wave infrared (SWIR) sensors, and near infrared (NIR) sensors.

Exemplary other sensor(s) 826 include: LIDAR sensor (e.g., for generating depth map), GPS, and IMU.

Sample images captured by imaging sensor(s) 812 and/or other data captured by other sensor(s) 826 may be stored in a repository, such as a server(s) 818, for example, a storage server, a computing cloud, virtual memory, and a hard disk.

Annotated dataset(s) 822A are created by annotating image(s) of the image(s) with a ground truth indication of identified objects, as described herein.

Training dataset(s) 822C may be created based on annotated dataset(s) 822A, as described herein.

Machine learning model(s) 822B may be trained on training dataset(s) 822C, as described herein.

Computing device 804 may receive the sample images and/or other data from imaging sensor(s) 812 and/or other sensor(s) 826 814 using one or more data interfaces 820, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)). Alternatively or additionally, Computing device 804 may receive the images and/or other data from client terminal(s) 808 and/or server(s) 818.

Hardware processor(s) 802 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 802 may include one or more processors (homogenous or heterogeneous), which may be arranged for parallel processing, as clusters and/or as one or more multi core processing units.

Memory 806 (also referred to herein as a program store, and/or data storage device) stores code instruction for execution by hardware processor(s) 802, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 806 stores code 806A and/or training code 806B that implements one or more acts and/or features of the method described with reference to FIGS. 1-7B and 8-10.

Computing device 804 may include a data storage device 822 for storing data, for example, annotated dataset(s) 822A of sample images annotated with detected objects, machine learning model(s) 822B as described herein and/or training dataset 822C for training machine learning model(s) 822B, as described herein. Data storage device 822 may be implemented as, for example, a memory, a local hard-drive, a removable storage device, an optical disk, a storage device, and/or as a remote server and/or computing cloud (e.g., accessed over network 810). It is noted that execution code portions of the data stored in data storage device 822 may be loaded into memory 806 for execution by processor(s) 802.

Computing device 804 may include data interface 824, optionally a network interface, for connecting to network 810, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 804 may access one or more remote servers 818 using network 810, for example, to download and/or provide images, other data, updated versions of machine learning model(s) 822B, code 806A, training code 806B, and/or the training dataset(s) 822C.

Computing device 804 may communicate using network 810 (or another communication channel, such as through a direct link (e.g., cable, wireless) and/or indirect link (e.g., via an intermediary computing device such as a server, and/or via a storage device) with one or more of:

Vehicle 850, for example, to receive images and/or other data captured by imaging sensor(s) 812 and/or other sensor(s) 826. To provide trained ML model 822B for installation on vehicle 850 for use by an automated vehicle process.

Client terminal(s) 808, for example, associated with vehicle 850.

Server 818, which may store sample images captured by imaging sensor 812 and/or other sensor(s) 826.

It is noted that imaging interface 820 and data interface 824 may exist as two independent interfaces (e.g., two network ports), as two virtual interfaces on a common physical interface (e.g., virtual networks on a common network port), and/or integrated into a single interface (e.g., network interface).

Computing device 804 includes or is in communication with a user interface 826 that includes a mechanism designed for a user to enter data (e.g., enter manual annotation) and/or view data (e.g., view the annotated dataset). Exemplary user interfaces 826 include, for example, one or more of, a touchscreen, a microscope, a display, a keyboard, a mouse, and voice activated software using speakers and microphone.

Referring now back to FIG. 1, in some embodiments, in 101 a sequence of registered images is produced from one or more sequences of images. Optionally, in 102 a sequence of images is used to produce a stacked scene. Optionally, the stacked scene is used to detect and annotate, i.e. classify and identify a bounding box, one or more objects in one or more of the sequence of images. Optionally, the sequence of images is one of the one or more sequences of images used to produce the sequence of registered images in 101. Optionally, the sequence of images is the sequence of registered images. Optionally, in 103 the stacked scene is used to detect and annotate one or more static objects in the sequence of images, i.e. one or more objects that do not move during the identified timeframe. Optionally, in 104 the stacked scene is used to detect and annotate one or more dynamic objects in the sequence of images, i.e. one or more other objects that move during the identified timeframe. Optionally, the one or more dynamic objects are detected and annotated after the one or more static objects are detected and annotated.

Figure 2:
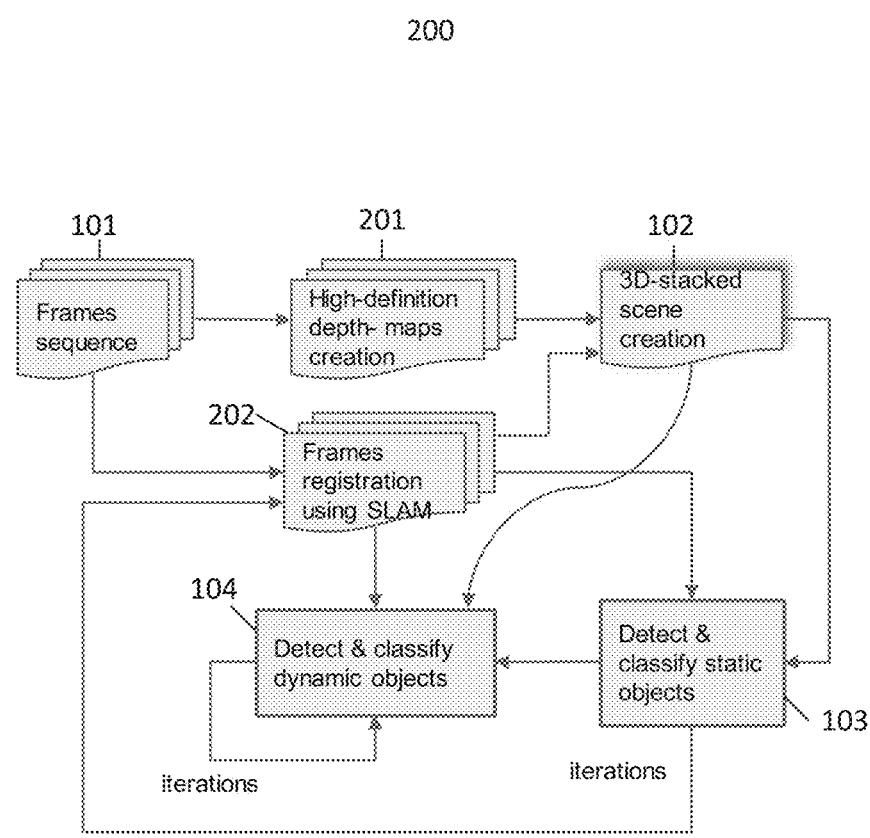
FIG. 2 is a flowchart schematically representing another optional flow of operations, according to some embodiments.

Reference is now made also to FIG. 2, showing a flowchart schematically representing another optional flow of operations 200 according to some embodiments, showing some more details. Optionally, the at least one hardware processor 802 of system 800 executes method 200 as code 806A. Optionally, in 201 the plurality of dense depth maps, used to create the stacked scene, are created using the sequence of images. Optionally, the stacked scene is created in 102 by further using a camera path produced by a SLAM process in 202. Optionally, the SLAM process is applied in 202 to the sequence of digital images. Optionally, a sequence of registered images produced by the SLAM process are used when detecting and classifying the one or more static objects in 103 and additionally or alternatively when detecting and classifying the one or more dynamic objects in 104.

Figure 3:
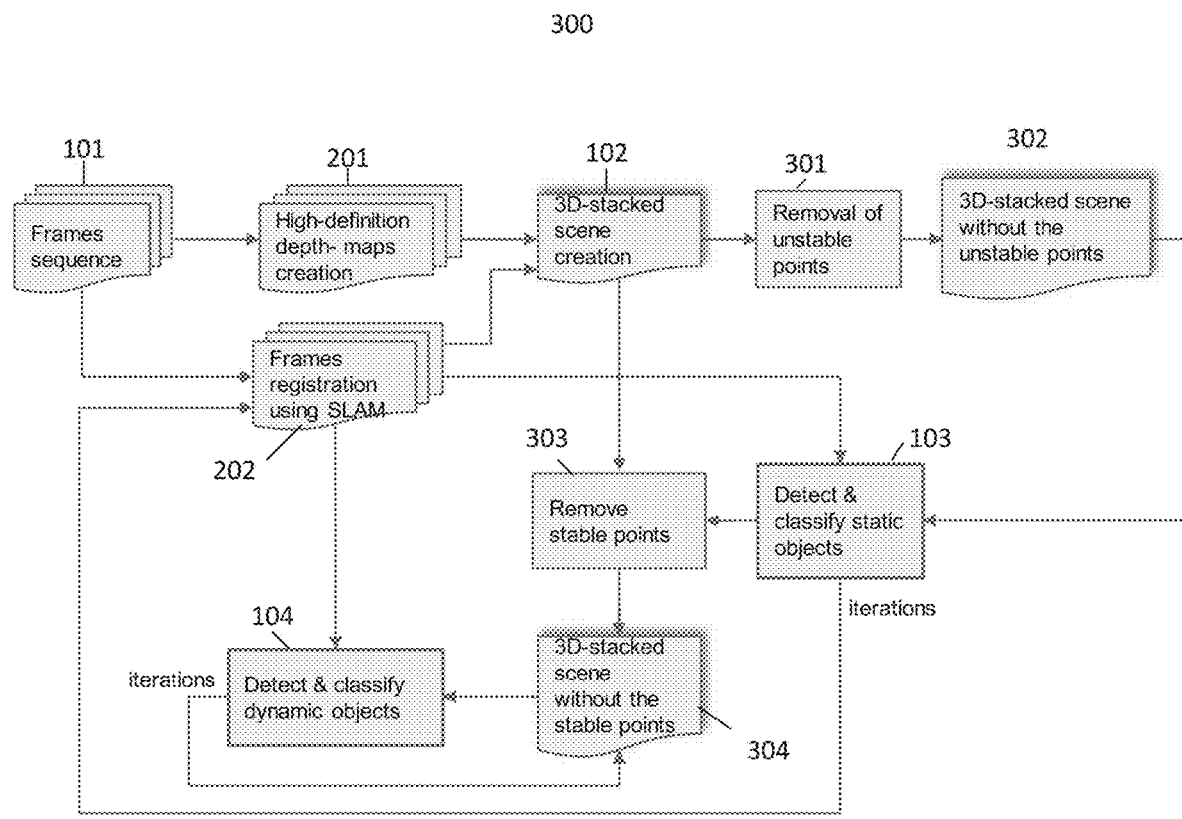
FIG. 3 is a flowchart schematically representing yet another optional flow of operations, according to some embodiments.

Reference is now made also to FIG. 3, showing a flowchart schematically representing yet another optional flow of operations 300 according to some embodiments, showing further details. Optionally, the at least one hardware processor 802 of system 800 executes method 300 as code 806A. To detect and annotate one or more static objects, in some embodiments in 301 a plurality of unstable points are removed from the stacked scene to produce in 302 a static stacked scene, comprising a plurality of points likely to be part of one or more static objects. Optionally, the plurality of unstable points are identified according to their respective stability score. For example, an unstable point may be a point having a stability score below an identified stability threshold. Optionally, in 301 statistical analysis is used to identify the plurality of unstable points, for example, using aggregation and clustering methods. Optionally, each removed point is set as undefined in the static stacked scene.

Optionally, the static stacked scene is used in 103 to detect and annotate one or more static objects in one or more images of the sequence of images. Optionally, one or more annotations are used to generate a sequence of annotated images from the sequence of images. Optionally, for an image of the sequence of images, a respective static image is produced by extracting from the image a plurality of static pixels identified according to the static stacked scene, for example by projecting the static stacked scene onto the image. Optionally, one or more static objects are detected and additionally or alternatively annotated in the static image, for example using a classification machine learning model trained to detect and additionally or alternatively classify one or more objects in an image and additionally or alternatively identify a binding box of the object.

Optionally, as the stacked scene is produced according to the plurality of registered images, a two-dimensional bounding box or a three-dimensional bounding box of an object identified in the stacked scene may be projected onto one or more of a sequence of images from which the plurality of registered images was generated. Optionally, projecting an object, or a bounding box of an object, onto an image uses tracking, to predict a projection onto the image. Optionally, projecting the object of the bounding-box of the object onto the image is used to verify annotation of the object in the image. Optionally, annotation of the object is modified according to a difference between an expected projection of an object and a detected location and classification of an object in the image.

Optionally, one object detected in one image is identified as another object detected in another image according to the stacked scene, as the stacked scene is produced according to the plurality of registered images. Optionally, a classification of the object identified in the one image is updated according to another classification of the object identified in another image.

Figure 4A:
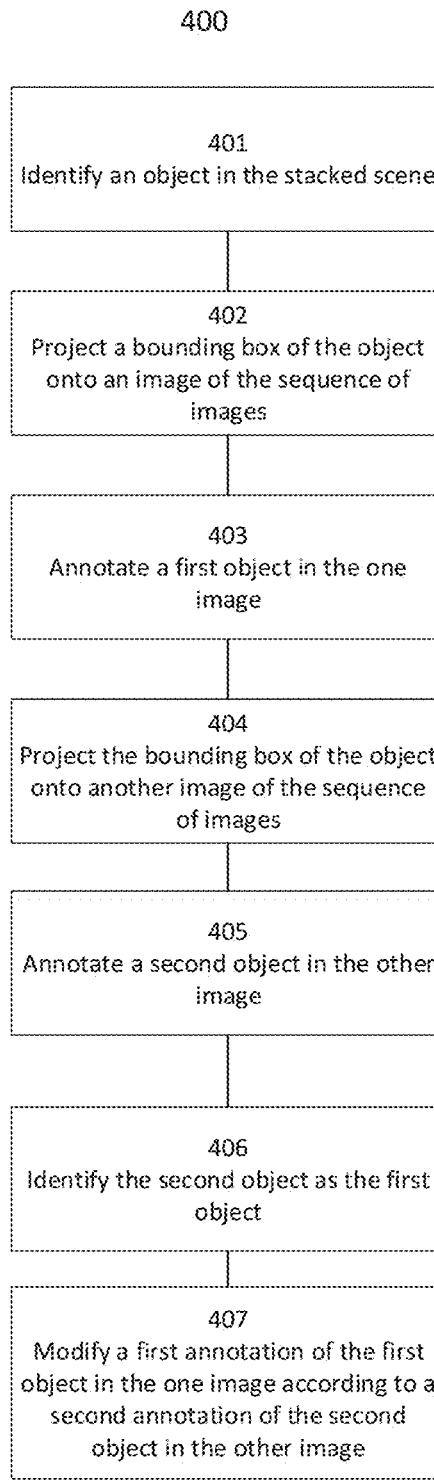
FIG. 4A is a flowchart schematically representing an optional flow of operations for annotating an object, according to some embodiments.

Reference is now made also to FIG. 4A, showing an optional flow of operations 400 for annotating an object, according to some embodiments. In such embodiments, in 401 an object is identified in the stacked scene. Optionally, the object is identified in the static stacked scene. Optionally, in 402 a bounding-box of the object in the stacked scene is projected onto one image of the sequence of images. The bounding-box may be a two-dimensional bounding-box. The bounding-box may be a three-dimensional bounding-box. In 403, a first object is optionally annotated in the one image with a first annotation, according to the projected bounding-box.

Figure 4B:
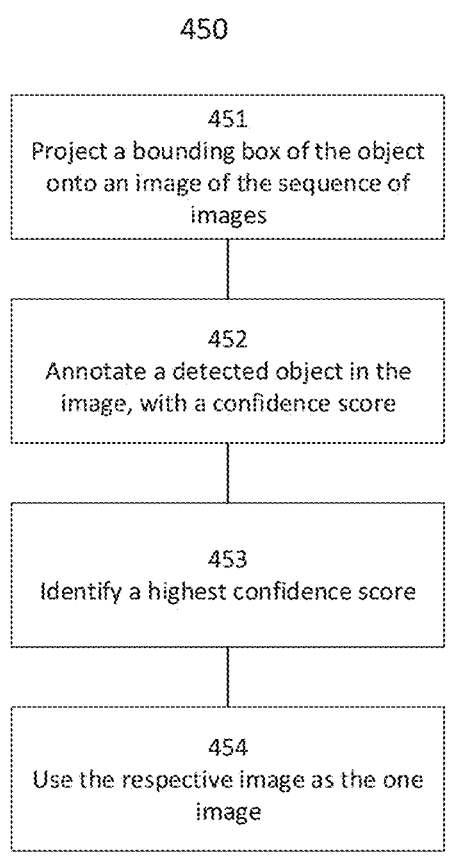
FIG. 4B is a flowchart schematically representing an optional flow of for projecting onto an image, according to some embodiments.

Reference is now made also to FIG. 4B, showing an optional flow of operations 450 for projecting onto an image, according to some embodiments. In such embodiments, a plurality of confidence scores are computed each in one of a plurality of iterations. Optionally, in each of the plurality of iterations, in 451 the bounding-box of the object is projected onto an image of the sequence of images, and in 452 optionally an object is annotated in the image. Optionally, the annotation has a confidence score, indicative of a likelihood the object is annotated correctly. In 453, optionally a highest confidence score of the plurality of confidence scores is identified. Optionally, in 454 an image associated with the highest confidence score is used as the one image for 402 and 403.

Reference is now made again to FIG. 4A. Optionally, in 404 the bounding-box is projected onto another image of the sequence of images. Optionally, in 405 a second object is annotated in the other image with a second annotation according to the projected bounding-box. Optionally, in 406 the first object is identified as the second object, optionally as both were annotated according to the bounding-box of the object identified in the stacked scene. Optionally, in 407, the first annotation is modified according to the second annotation. Optionally, the one image precedes the other image in the sequence of images. Optionally, the other image precedes the one image in the sequence of images. Optionally, 402, 403, 404, 405, 406, and 407 are repeated in a plurality of iterations for the object. Optionally, method 400 is repeated in another plurality of iterations for another object identified in the stacked scene.

Optionally, a super-resolution image of the object is built from the plurality of images the object appears therein, composing a plurality of object features details it contains, enabling better classification based on them. Optionally, in 407 a bounding box of the object identified in the image is updated according to the other classification. For example, if an object is classified as a bicycle in the image and later classified as a motorcycle in the other image, the object classification in the image is optionally changed to motorcycle following the object classification in the other image. Optionally, the bounding box of the object in the image is changed according to the object's classification as a motorcycle instead of a bicycle. In another example, a traffic sign may be detected in a first image, however details of the sign may not be available from the first image, thus classifying the sign as a generic traffic sign. When the traffic sign is classified in a second image as a speed limit sign, the sign may be re-classified in the first image as a speed limit sign. Similarly a super resolution image built out of the stacked scene may be used for updating the second annotation.

Optionally, one or more stability scores of the stacked scene are modified according to the one or more static objects detected and annotated in the sequence of images. For example, a point in the stacked scene associated with a pixel in a static object may be given a stability score indicative of a static object at that point.

Reference is now made again to FIG. 3.

Two optional iterations loops are presented:
1. Using the static objects classification to enhance the SLAM result by improving the SLAM distinction of the static environment and objects in order to improve its calculations results.
2. Tracking dynamic objects' bounding boxes for improving their detection and classification.

Optionally, this process is repeated iteratively, modifying one or more classifications of one or more objects in one or more images. Optionally this process is repeated until reaching stability, optionally determined according to one or more tests, for example when an amount of classification changes is below an identified change threshold, and/or identifying a minimum point in changes over an identified amount of iterations. It is important to note that the other image may precede the image in the sequence of images, and conversely the other image may come after the image in the sequence of images. Thus, the iterative process may move forward and backward in the sequence of images. Optionally, minimization of a difference between an expected annotation and an annotation is done using the stacked scene, rather than projecting a model of an object identified in the stacked scene or the object's bounding box over the images themselves.

Optionally, the stacked scene representation of the scene is used to modify at least some of the plurality of registered images and additionally or alternatively at least one camera position and orientation associated with at least one of the plurality of registered images. Optionally, a three dimensional model of an object is generated in additional to the stacked scene representation of the scene. Additionally, or alternatively, a three-dimensional model of an object is used to modify the at least some of the plurality of registered images and additionally or alternatively the at least one camera position and orientation associated with the at least one of the plurality of registered images, using a minimization of an error between the three-dimensional model of the object and the stacked scene. Additionally, or alternatively, an ideal three-dimensional model of an ideal object, selected according to a classification of the object, is used to modify the at least some of the plurality of registered images and additionally or alternatively the at least one camera position and orientation associated with the at least one of the plurality of registered images. Optionally, for an object identified in one image of the plurality of images, an expected bounding box in another image of the plurality of images is computed according to the stacked scene. Optionally, the expected bounding box is computed according to expected loss of details or change in details due to a difference in viewpoint between the image and the other image, for example using tracking according to an output of the SLAM process in 202. Other considerations in computing the expected bounding box include expected truncation of the object, expected occlusion of the object, expected size of the object and expected location of the object. Optionally, the expected bounding box is compared to an identified bounding box of the object, identified in the other image. Optionally, at least some of the plurality of registered images and additionally or alternatively at least one camera position and orientation associated with at least one of the plurality of registered images are modified according to a difference between the identified bounding box and the expected bounding box.

Optionally, a new static stacked scene is generated according to the modified plurality of registered images and the modified at least one camera position and orientation. Optionally, one or more static objects are re-detected and additionally or alternatively re-annotated according to the new stacked scene. Optionally, one or more stability scores of the new static stacked scene is updated according to the modified plurality of registered images and the modified at least one camera position and orientation.

Optionally, generating a new stacked scene, updating one or more object classifications and annotations, and updating at least some of the plurality of registered images and additionally or alternatively at least one camera position and orientation associated with at least one of the plurality of registered images are repeated in each of a plurality of iterations.

Optionally, one or more static objects are identified in the stacked scene (or the new-stacked scene). Optionally, one or more classifications of the one or more objects in one or more of the sequence of objects is updated according to the one or more static objects identified in the stacked scene.

To detect and annotate one or more dynamic objects, in some embodiments in 303 a plurality of stable points are removed from the stacked scene (or a new stacked scene) to produce in 304 a dynamic stacked scene, i.e a stacked scene containing points that are likely to contain dynamic objects. Optionally, the plurality of stable points are identified according to their respective stability score. For example, a stable point may be a point having a stability score above the identified stability threshold, defined for example, using aggregation and clustering methods. Additionally, or alternatively, a plurality of static objects may be removed from the stacked scene (or a new-stacked scene) to produce the dynamic stacked scene. Optionally, at least some of the plurality of static objects are detected as described above. Optionally, each removed point is set as undefined.

Optionally, the dynamic stacked scene is used to detect and annotate one or more dynamic objects in one or more images of the sequence of images. Optionally, one or more annotations of the one or more dynamic objects are further used to generate the sequence of annotated images from the sequence of images. Optionally, for an image of the sequence of images, a respective dynamic image is produced by extracting from the image a plurality of dynamic pixels identified according to the dynamic stacked scene, for example by projecting the dynamic stacked scene onto the image. Optionally, one or more dynamic objects are detected and additionally or alternatively annotated in the dynamic image, for example using a classification machine learning model trained to detect and additionally or alternatively classify one or more objects in an image and additionally or alternatively identify a bounding box of the object. Optionally one or more annotations of the one or more dynamic objects are used to produce the sequence of annotated images from the sequence of images. Optionally, one or more dynamic objects are detected and additionally or alternatively annotated in the dynamic image by using a three-dimensional model of the object produced over the stacked scene, and projecting the three-dimensional model over the image. Optionally, for a dynamic object identified in one image of the plurality of images, an expected bounding box in another image of the plurality of images is computed according to the dynamic stacked scene. Optionally, the expected bounding box is computed according to expected loss of details or change of details due to a difference in viewpoint between the image and the other image. The expected loss of details or change of details are additionally or alternatively due to movement of the dynamic object, for example using tracking of the movement of the dynamic object, and additionally or alternatively due to movement of other objects in the stacked scene. Other considerations in computing the expected bounding box include expected truncation of the object, expected occlusion of the object, expected size of the object and expected location of the object. Optionally, the expected bounding box is compared to an identified bounding box of the dynamic object, identified in the other image. Optionally, a classification of the dynamic object and additionally or alternatively a bounding box of the dynamic object are modified according to a difference between the identified bounding box and the expected bounding box, where the difference is used as an error parameter to the classification process that as a result might classify the object as a different object, optionally to minimize the difference. Additionally, or alternatively, an ideal three-dimensional model of an ideal object, selected according to a classification of the dynamic object, is used to compute the expected bounding-box, and additionally or alternatively the ideal three-dimensional model is used to modify classification of the dynamic object and additionally or alternatively the bounding box of the dynamic object.

Optionally, method 400 is executed such that in 401 the object is identified in the dynamic stacked scene.

Optionally, this process is repeated iteratively, modifying one or more classifications of one or more dynamic objects in one or more images. Optionally this process is repeated until reaching stability, optionally determined according to one or more tests, for example when an amount of classification changes of one or more dynamic objects is below another identified change threshold or having a minimum error over the repetitions. It is important to note that, as with classification of static objects, the other image may precede the image in the sequence of images, and conversely the other image may come after the image in the sequence of images. Thus, the iterative process considers the two-dimensional projection of the object's three-dimensional model made over the stacked scene, over the sequence of images.

Identifying one or more dynamic objects using the stacked scene produced using a plurality of dense depth maps facilitates identifying and annotating one or more objects under harsh transitions conditions, such as transition in an entrance or an exit of a tunnel where light level changes abruptly and therefore the camera is in sudden blindness or over-exposure, and additionally or alternatively annotating one or more relevant objects not at a current level of the road such as a vehicle on another road at another level that is due to interconnect to the level of the vehicle producing the images through its sensors, and additionally or alternatively transitions between urban-roads to highway.

Optionally, the sequence of annotated images generated from the sequence of images as described above is used to train, validate, test, verify, or any combination thereof, an autonomous driving system, for example an ADS or an ADAS, or a component thereof.

Figure 9:
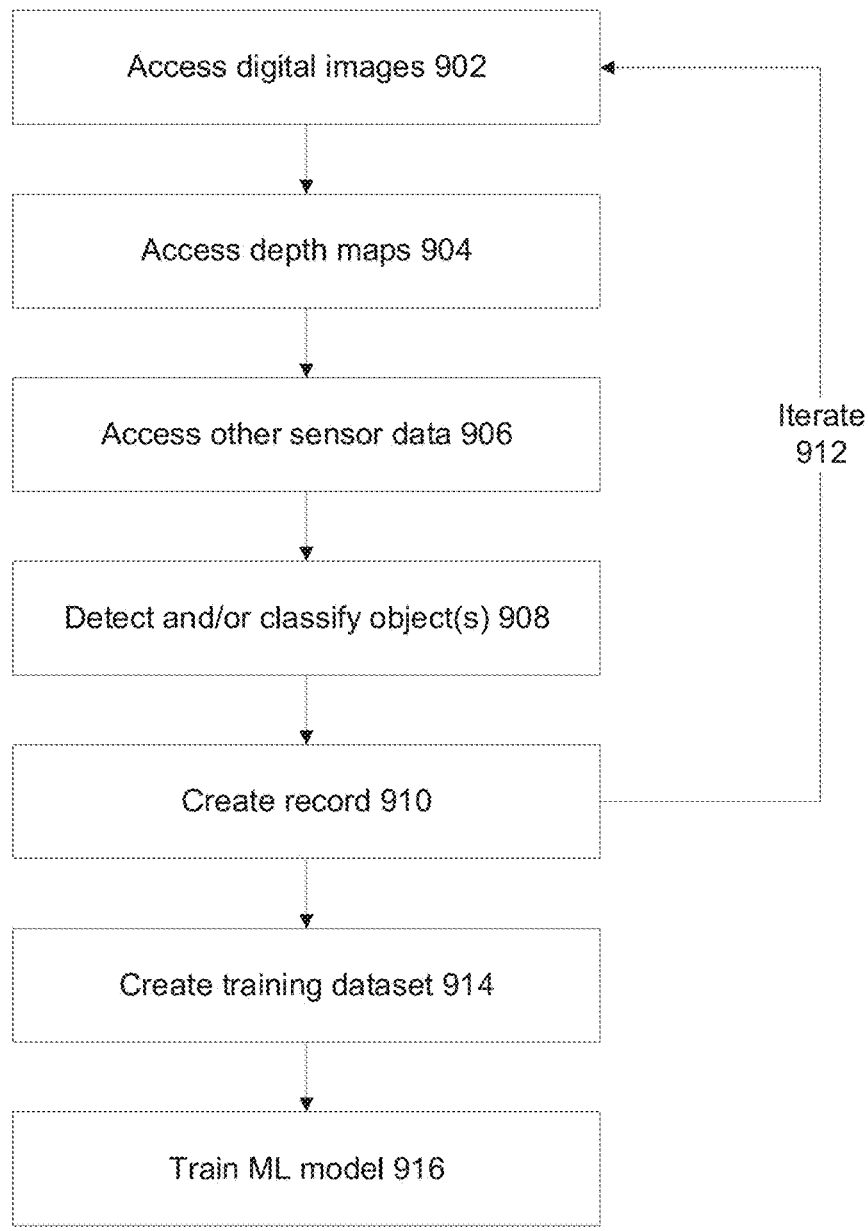
FIG. 9 is a flowchart of a method of creating an annotated training dataset for training an ML model according to some embodiments.

Reference is now made to FIG. 9, which is a flowchart of a method of creating an annotated training dataset for training an ML model according to some embodiments.

At 902, digital images are accessed. Optionally, at each iteration for creating a respective record, one set of digital images is received. The digital images are optionally a sequence of images, for example, captured by a video camera and/or sequentially by a still camera.

The digital images may be captured over a time interval, for example, about 1 second, about 2 seconds, about 3 seconds, about 0.5-5 seconds, about 1-3 seconds, or other values.

The digital images may be captured by an onboard camera located on a vehicles. Different sets of images may be captured by the same camera on the same vehicle over different time intervals, and/or by different cameras on different vehicles.

At 904, dense depth maps are accessed. Dense depth maps may be captured and/or computed as described herein, for example, using LIDAR data obtained from a LIDAR sensor.

At 906, other data from other sensors may be accessed, for example, GPS, IMU, and the like, as described herein. The other sensor data may be used, for example, to apply the SLAM approach to the sequence of images, as described herein.

At 908, objects are detected and/or classified, as described herein. The objects are detected and classified for one or more images of the set of digital images, such as of the sequence of images, as described herein.

The images for which the objects are detected and classified may include additional images for which objects cannot be detected and classified using standard approaches, but for which objects are detected and classified using embodiments described herein.

The detected objects may be static and/or dynamic objects, as described herein.

Optionally different objects are classified, for example, by assigning a classification category, such as a tag, for example, vehicle, sign, pedestrian, and the like. Alternatively, objects are classified as a single category, for example, "hazard" indicating any hazard.

At 910, a record is created. The record includes at least the image(s) for which the object is detected, and a ground truth indication of the detected and classified object. The ground truth may be, for example, a bounding box, an arrow, a segmentation, and a metadata tag (e.g., classification category).

Record may include additional data for example, additional images of the sequence where the object is found using embodiments descried herein, images where no object is found (for which the ground truth is lack of detected object), dense depth maps, and other sensor data. The additional data may be included, for example, where such data is expected to be found during inference, for example, in vehicles that have sensors installed that generate depth maps and/or in vehicles that have other sensors installed.

At 912, one or more features described with reference to 902-910 are iterated to create multiple records. Iterations may be, for example, over multiple time intervals and/or for different cameras and/or for different vehicles.

At 914, a training dataset that includes the multiple records is created. One or more training dataset may be created. Training datasets may be general for example, including different images of different objects. Training datasets may be specific, for example, images of specific scenes and/or specific objects, for example, for different countries which have different signs which may be in different languages.

At 916, one or more ML models are trained on the training dataset. The ML model is trained for generating an outcome of at least one target object in response to an input of at least one target image.

Figure 10:
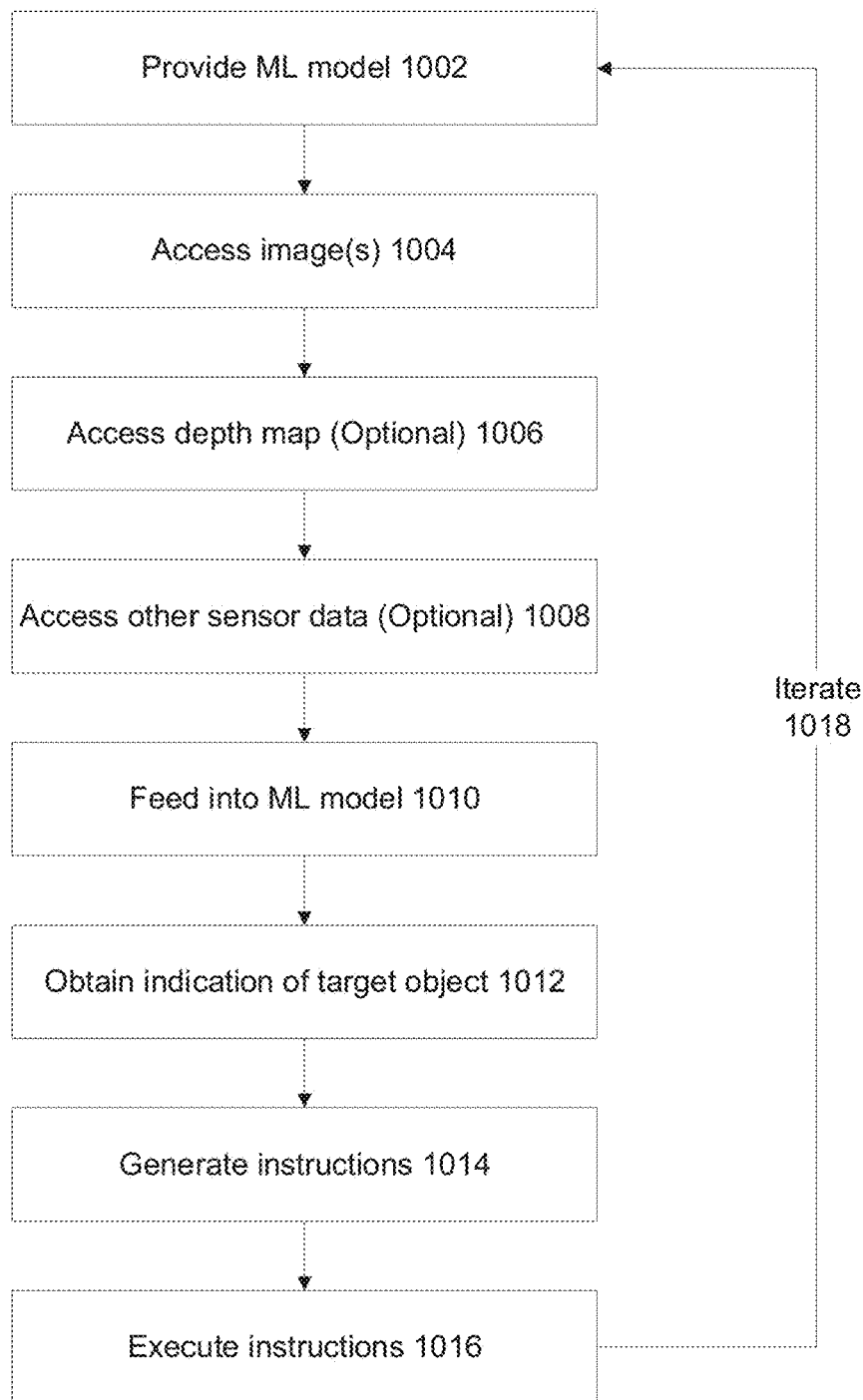
FIG. 10 is a flowchart of a method for real time object detection by a trained ML model according to some embodiments.

Reference is now made to FIG. 10, which is a flowchart of a method for real time object detection by a trained ML model according to some embodiments.

At 1002, the ML model is provided. For example, the ML model is downloaded from a server and/or is previously installed. The ML model may be locally stored on a memory and/or data storage device of the vehicle. The vehicle may be fully automated, semi automated, and/or driven by a human driver with ADAS using the ML model.

The ML model is trained, for example, as described with reference to FIG. 9.

At 1004, one or more digital images are accessed. The digital image(s) may be obtain in real time using an imaging sensor installed on the vehicle.

Images may be individual images, or a sequence of images obtained over a time interval. For example, about 1 second, about 2 seconds, about 3 seconds, about 0.5-5 seconds, about 1-3 seconds, or other values.

At 1006, dense depth maps may be accessed. Dense depth maps may be captured and/or computed using onboard sensors, for example, as described herein. In some implementations, no depth maps are obtained.

At 1008, other data from other sensors may be accessed. Data may be captured from other sensors installed on the vehicle, for example, as described herein. In some implementations, no other sensor data is obtained.

At 1010, the digital images and optionally dense maps and/or other data is fed into the ML model.

At 1012, an indication of at least one target object depicted in the target image is obtained as an outcome of the machine learning model.

At 1014, instructions may be generated according to the target object. For example, the indication of target object is analyzed by another process, and/or the indication of target object is fed into an automatic vehicle controller.

The instructions may be automatic instructions for execution by computer controllers (e.g., circuitry), for example, signals and/or code. For example, instructions are generated for automatically maneuvering the vehicle to avoid collision with the target object, such as braking, slowing down, and turning the vehicle. In another example, instructions are generated for automatically controlling the vehicle to comply with a signs, for example, to stop at a stop sign, slow down or speed up according to the speed limit on the sign, and the like.

The instructions may be manual instructions for execution by a human driver. For example, a warning is generated on a user interface (e.g., head on display, audio message played over speakers, text and/or images presented on a screen) to warn the driver of the vehicle of the detected target object and/or instruct the driver to obey the traffic sign.

At 1016, the instructions are executed, automatically and/or manually, for example, to maneuver the vehicle to avoid collision into the detected object and/or to obey the traffic signs.

At 1018, one or more features described with reference to 1002-1016 are iterated, for example, continuously over time, using sequentially acquired images, to provide real time autonomous vehicle control and/or real time alerts to a driver.

EXAMPLES

The following examples demonstrate some of the types of images described above.

Figure 5A:
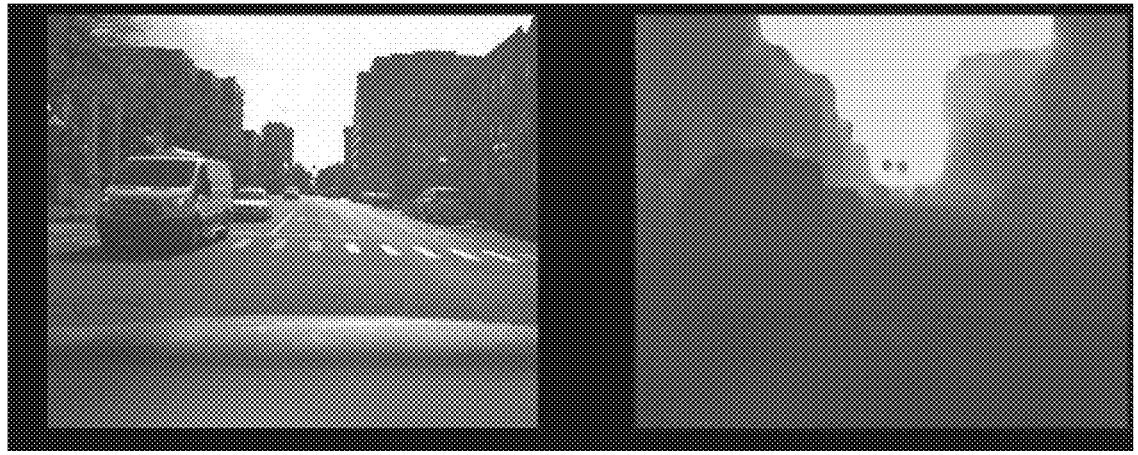
FIGS. 5A and 5B are exemplary images captured by a sensor and their respective depth maps, according to some embodiments.
Figure 5B:
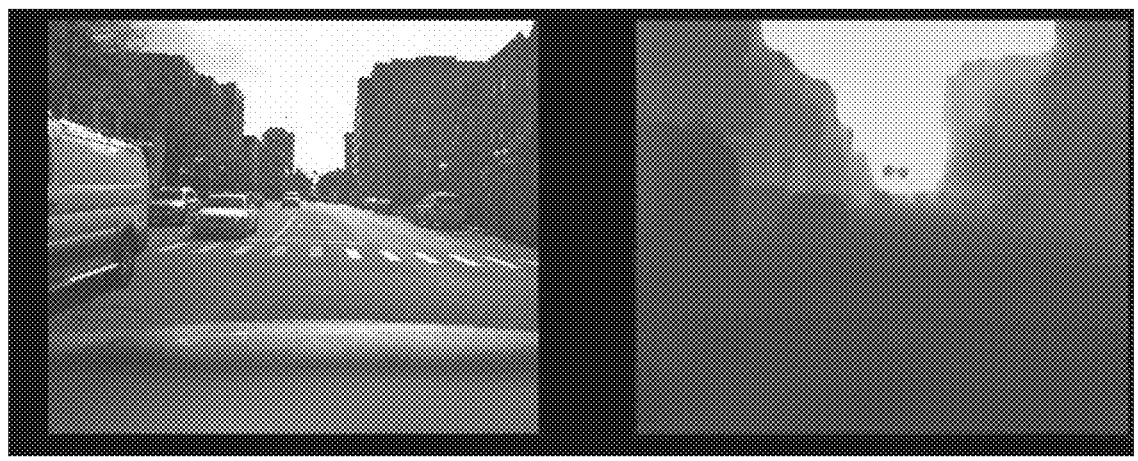

Reference is now made also to FIGS. 5A and 5B showing two exemplary consecutive images captured by a sensor and their respective depth maps, according to some embodiments. In each of FIGS. 5A and 5B, the left half depicts an image captured by a sensor in a scene, and the right half depicts the respective depth map of the image, where brightness indicates a distant pixel and darkness indicates a close pixel. In some embodiments, colors indicate distance.

Figure 6:
FIG. 6 is an exemplary image depicting a superposition of the exemplary images, according to some embodiments.

Reference is now made also to FIG. 6, showing an exemplary image depicting a registration superposition of the exemplary images in FIGS. 5A and 5B, according to some embodiments. In the left side of the image a smeared depiction of a vehicle can be seen, where the same vehicle can be seen in two locations, indicating it is dynamic and moving. For better visibility, the superposition uses Jet color-mapping of scene images in FIGS. 5A and 5B.

Figure 7A:
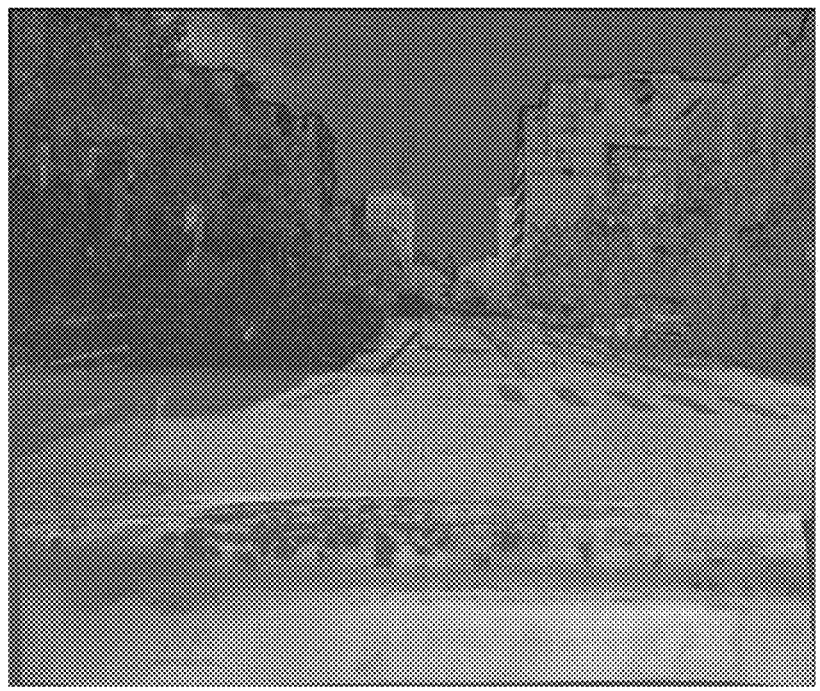
FIG. 7A is an exemplary static image, according to some embodiments.

Reference is now made also to FIG. 7A, showing an exemplary static image, according to some embodiments. In this image, non-static pixels possibly describing the moving vehicle, were removed, leaving only pixels with a high likelihood of being stable and belonging to static objects.

Figure 7B:
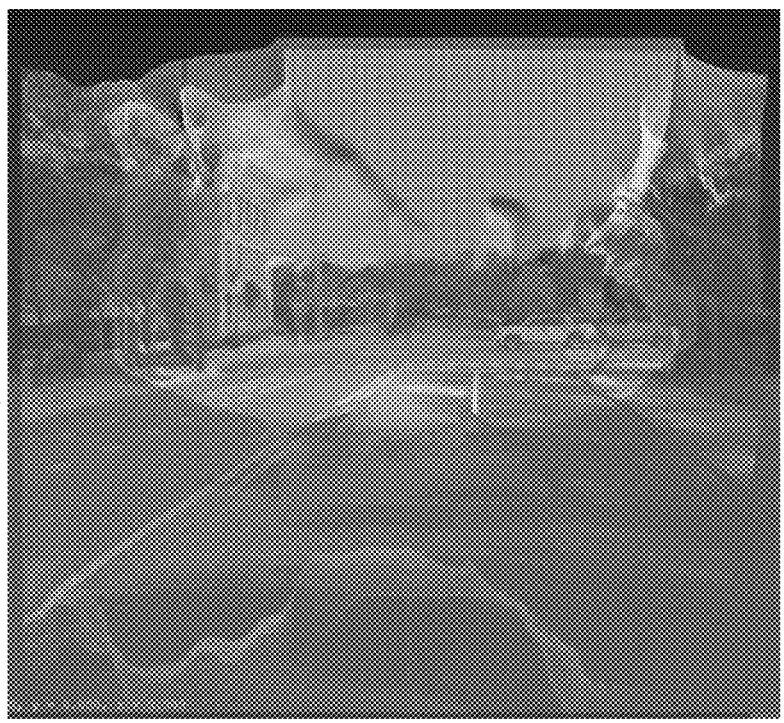
FIG. 7B is an exemplary image depicting a reconstructed three-dimensional scene, according to some embodiments.

Reference is now made also to FIG. 7B, showing an exemplary image depicting a reconstructed three-dimensional scene, produced using a plurality of registered images captured by a moving camera, according to some embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant annotations will be developed and the scope of the term annotation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

In addition, any priority document(s) of this application is/are hereby incorporated herein by reference in its/their entirety.

What is claimed is:

1. A method for annotating a plurality of digital images, comprising:
   generating, from a plurality of digital images and a plurality of dense depth maps, each associated with one of the plurality of digital images, an aligned three-dimensional stacked scene representation of a scene, where the plurality of digital images are captured by at least one sensor at the scene, and where each point in the three-dimensional stacked scene is associated with a stability score indicative of a likelihood the point is associated with a static object of the scene;
   removing from the three-dimensional stacked scene a plurality of instable points to produce a static three-dimensional stacked scene;
   detecting in at least one image of the plurality of digital images at least one static object according to the static three-dimensional stacked scene; and classifying and annotating the at least one static object.

2. The method of claim 1, wherein detecting the at least one static object according to the static three-dimensional stacked scene comprises:
   identifying in the at least one image a set of static pixels by projecting the static three-dimensional stacked scene onto the at least one image;
   extracting the set of static pixels from the at least one image to create a static image; and
   detecting the at least one static object in the static image.

3. The method of claim 1, further comprising:
   detecting, in at least one other digital image of the plurality of digital images at least one other static object according to the static three-dimensional stacked scene;
   identifying, according to the static three-dimensional stacked scene, that the at least one static object is the at least one other static object; and
   classifying and annotating the at least one other static object according to a classification and annotation of the at least one static object.

4. The method of claim 3, wherein the plurality of digital images is a sequence of digital images where the at least one image precedes the at least one other digital image in the sequence of digital images or the at least one other digital image precedes the at least one image in the sequence of digital images.

5. The method of claim 1, wherein detecting the at least one static object according to the static three-dimensional stacked scene comprises detecting the at least one static object in the static three-dimensional stacked scene.

6. The method of claim 1, further comprising:
   applying a simultaneous localization and mapping (SLAM) method to the plurality of digital images to produce a plurality of registered digital images and a camera path comprising a plurality of camera positions and camera orientations associated therewith;
   wherein generating the stacked scene is further by using the plurality of registered digital images and the camera path.

7. The method of claim 1, further comprising:
   removing from the stacked scene a plurality of stable points to produce a dynamic three-dimensional stacked scene;
   detecting in at least one additional other image of the plurality of digital images at least one dynamic object according to the dynamic three-dimensional stacked scene; and
   classifying and annotating the at least one dynamic object.

8. The method of claim 7, wherein detecting the at least one dynamic object according to the dynamic three-dimensional stacked scene comprises:
   identifying in the at least one additional other image a set of dynamic pixels by projecting the dynamic three-dimensional stacked scene onto the at least one additional other image;
   extracting the set of dynamic pixels from the at least one additional other image to create a dynamic image; and
   detecting the at least one dynamic object in the dynamic image.

9. The method of claim 7, further comprising:
detecting, in at least one further other digital image of the plurality of digital images at least one other dynamic object according to the dynamic three-dimensional stacked scene;
identifying, according to the dynamic three-dimensional stacked scene, that the at least one dynamic object is the at least one other dynamic object; and
classifying and annotating the at least one other dynamic object according to a classification and annotation of the at least one dynamic object.

10. The method of claim 9, wherein the plurality of digital images is a sequence of digital images where the at least one additional other image precedes the at least one further other digital image in the sequence of digital images or the at least one further other digital image precedes the at least one additional other image in the sequence of digital images.

11. The method of claim 1, further comprising creating a training dataset comprising a plurality of records, wherein a record includes the at least one image of the plurality of digital images, and a ground truth label indication of the at least one static object.

12. The method of claim 11, wherein the record further includes at least one other digital image of the plurality of digital images and a ground truth label indication of at least one other static object according to a classification and annotation of the at least one static object.

13. The method of claim 11, wherein the record further includes a dense depth map associated with the at least one image of the plurality of digital images.

14. The method of claim 11, wherein the record further includes at least one additional other of the plurality of digital images, and a ground truth label of an indication of at least one dynamic object.

15. The method of claim 11, further comprising training a machine learning model on the training dataset for generating an outcome of at least one target object in response to an input of at least one target image.

16. The method of claim 11, wherein a plurality of images of a plurality of records of the training dataset are captured by at least one camera located on at least one vehicle.

17. A method for generating instructions for real time object recognition for a vehicle, comprising:
feeding at least one target image captured by a camera located on a moving vehicle into a machine learning model training on a training dataset comprising a plurality of records, wherein a record includes at least one of a plurality of digital images for which at least one static object is detected, and a ground truth label indicating at least one static object, the ground truth label computed by:
generating, from the plurality of digital images and a plurality of dense depth maps, each associated with one of the plurality of digital images, an aligned three-dimensional stacked scene representation of a scene, where the plurality of digital images are captured by at least one sensor at the scene, and where each point in the three-dimensional stacked scene is associated with a stability score indicative of a likelihood the point is associated with a static object of the scene,
removing from the three-dimensional stacked scene a plurality of instable points to produce a static three-dimensional stacked scene,
detecting in the at least one of the plurality of digital images the at least one static object according to the static three-dimensional stacked scene, and
generating the ground truth label indicating classifying and annotating the at least one static object;
obtaining, as an outcome of the machine learning model, an indication of at least one target object depicted in the at least one target image; and
generating instructions according to the at least one target object.

18. The method of claim 17, wherein generating instructions comprises generating instructions for automatically maneuvering the vehicle to avoid collision with the at least one target object.

19. The method of claim 17, wherein generating instructions comprises generating a warning on a user interface to warn a driver of the vehicle of the at least one target object.

20. A method of training a machine learning model for real time object recognition for a vehicle, comprising:
creating a training dataset comprising a plurality of records, wherein a record includes:
at least one of a plurality of digital images captured by at least one onboard camera of at least one vehicle; and
a ground truth label indicating at least one static object detected in the at least one of the plurality of digital images, the ground truth label computed by:
generating, from the plurality of digital images and a plurality of dense depth maps, each associated with one of the plurality of digital images, an aligned three-dimensional stacked scene representation of a scene, where the plurality of digital images are captured by at least one sensor at the scene, and where each point in the three-dimensional stacked scene is associated with a stability score indicative of a likelihood the point is associated with a static object of the scene,
removing from the three-dimensional stacked scene a plurality of instable points to produce a static three-dimensional stacked scene,
detecting in the at least one of the plurality of digital images the at least one static object according to the static three-dimensional stacked scene, and
generating the ground truth label indicating classifying and annotating the at least one static object; and
training a machine learning model on the training dataset for generating an outcome of at least one target object in response to an input of at least one target image,
wherein the outcome of the at least one target object depicted in the at least one target image is used to generate instructions for controlling the vehicle.

* * * * *